United States Patent
Dabov

(10) Patent No.: US 8,730,372 B2
(45) Date of Patent: May 20, 2014

(54) PARTIALLY LIT SENSOR

(75) Inventor: Teodor Dabov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 13/241,562

(22) Filed: Sep. 23, 2011

(65) Prior Publication Data

US 2013/0076965 A1 Mar. 28, 2013

(51) Int. Cl.
- *H04N 5/225* (2006.01)
- *H04N 5/222* (2006.01)
- *H04N 9/64* (2006.01)
- *H04N 3/14* (2006.01)

(52) U.S. Cl.
USPC ... 348/340; 348/333.01; 348/250; 348/208.1; 348/294; 348/298

(58) Field of Classification Search
USPC .................. 257/432, 433, 435; 348/294, 340
See application file for complete search history.

(56) References Cited

U.S. PATENT DOCUMENTS

| | | | |
|---|---|---|---|
| 6,344,877 B1 | 2/2002 | Gowda et al. | |
| 7,123,292 B1 | 10/2006 | Seeger et al. | |
| 7,380,948 B2 | 6/2008 | Schofield et al. | |
| 7,822,338 B2* | 10/2010 | Wernersson | 396/429 |
| 2009/0213232 A1* | 8/2009 | Asakura et al. | 348/208.4 |
| 2010/0141571 A1 | 6/2010 | Chiang et al. | |
| 2011/0248367 A1* | 10/2011 | Yang et al. | 257/432 |
| 2011/0304763 A1* | 12/2011 | Choi et al. | 348/340 |

* cited by examiner

*Primary Examiner* — Twyler Haskins
*Assistant Examiner* — Padma Haliyur
(74) *Attorney, Agent, or Firm* — Brownstein Hyatt Farber Schreck, LLP

(57) ABSTRACT

An image sensing system for an electronic device. The image sensing system includes a lens and an image sensor. The image sensor includes a indirectly lit area of pixels and a directly lit area of pixels. The lens is in optical communication with the directly lit area of pixels.

20 Claims, 8 Drawing Sheets

PARTIALLY LIT SENSOR

TECHNICAL FIELD

The present invention relates generally to electronic devices and more specifically, to sensors for electronic devices.

BACKGROUND

Some electronic devices may incorporate a digital camera to add functionality to the device. A digital camera may typically include a lens, a support structure, and an image sensor, among other elements. The lens is generally centered directly on the image sensor so that the maximum number of sensor pixels can capture the light as it is transmitted through the lens. Although this system may increase the number of exposed pixels, it may also lead to an inefficient packaging system or enclosure for the support structure of the camera. This is because generally the lens may need to be at least partially elevated over the sensor and may be centered over the sensor. Thus, there may be an elevated area of unused space between the lens and the sensor. This space may be significant, especially in mobile electronic devices, where there may be a desire that component be as small as possible to minimize the size of the device.

SUMMARY

One example of an embodiment described herein may take the form of an image sensing system comprising: a lens; an image sensor defining an indirectly lit area and a directly illuminated area and in optical communication with the directly illuminated area; and an obstruction positioned between the lens and image sensor, the obstruction preventing optical communication between the lens and a portion of the image sensor other than the directly illuminated area.

Another embodiment may take the form of a method for assembling a camera system, the method including the operations of: providing an image sensor having a first surface area and a second surface area; operably connecting an enclosure to the image sensor, the enclosure comprising: a first support structure; and a second support structure; and aligning a lens over a first surface area of the image sensor, so that light transmitted through the lens does not directly impact a second surface area of the image sensor.

Yet another sample embodiment may take the form of an electronic device including: a processor; a display in communication with the processor; a camera system in communication with the processor, the camera system having a lens and an image sensor including a non-illuminated area and a directly illuminated area; wherein the lens is in optical communication with the directly illuminated area, but is not in optical communication with the non-illuminated area.

It should be appreciated that the foregoing examples are provided for illustration only and are not meant to be limiting. Additional embodiments, including apparatuses, systems and methods will be apparent upon reading this disclosure in its entirety.

SPECIFICATION

Figure 1A:
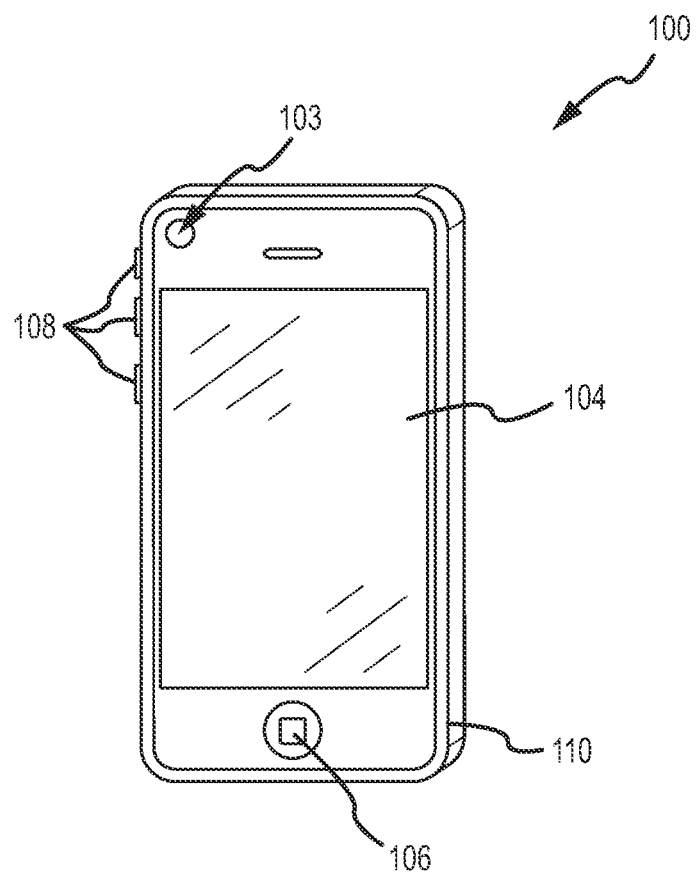
FIG. 1A is a front perspective view of an exemplary electronic device incorporating a camera system.

Some embodiments described herein may take the form of a partially lit image sensor. As referred to herein, "lit" means light directly focused onto the image sensor; in other words the areas or pixels of the image sensor where light encounters pixels of the image sensor. As one non-limiting example, "lit" areas may be thought of as being illuminated by light passing through an associated lens or aperture when a camera, or other device, incorporating the sensor is in operation. The partially lit sensor may be supported and at least partially in optical communication with a lens or other optical transmitting component. In some embodiments, the lens and the image sensor may be elements of a camera that may be included as portion of an electronic device, such as a smartphone, mobile computer, or a digital camera.

The image sensor typically is positioned so that at least some portion of the image sensor pixels does not receive any light transmitted through the lens. In other words, only a portion of the image sensor may be lit, so that some of the pixels of the sensor may be "dead" or non-lit. This system may allow the size of the packaging of the lens and image sensor to be reduced, thereby potentially saving height and space within an enclosure for the electronic device.

Using a partially lit sensor may also decrease the cost associated with a camera for a particular electronic device, when compared to the use of a fully-lit sensor. For example, in some instances a particular image sensor may be selected based on price as opposed to size constraints of the electronic device. For example, a physically larger image sensor may be less expensive than a smaller pixel image sensor due to a supply surplus of the former. However, in some conventional electronic devices the larger pixel image sensor may not be used due to the fact that the particular sensor, when incorporated into the camera system or enclosure, may take up too much interior space. By contrast, in certain embodiments discussed herein, an image sensor may be included in the camera system without significantly impacting the overall area of the camera enclosure. Thus, the size and/or dimensions of the image sensor may have less impact on the arrangement of components within an interior volume of the device. Since positioning and/or packaging the sensor may be more flexible, a variety of different sensors may be employed instead of requiring a very specific sensor. This, coupled with the possibility of reclaiming interior volume for other components and functions, may significantly reduce the cost of the electronic device, without substantially increasing the size of the electronic device. Alternately, additional features may be provided for the device while maintaining a similar cost.

Furthermore, some pixels of the image sensor may be indirectly lit, insofar as they are adjacent to directly lit pixels and receive some light through the aperture and/or lens. These indirectly lit pixels of the image sensor may be used as an ambient light sensor. In these embodiments, the indirectly lit pixels may assist the electronic device in creating and/or modifying an image captured by the directly-lit pixels of the sensor. For example, the image captured by the image sensor may be enhanced with a particular filter based on the ambient light conditions sensed by a portion of the indirectly lit pixels of the image sensor.

Figure 1B:
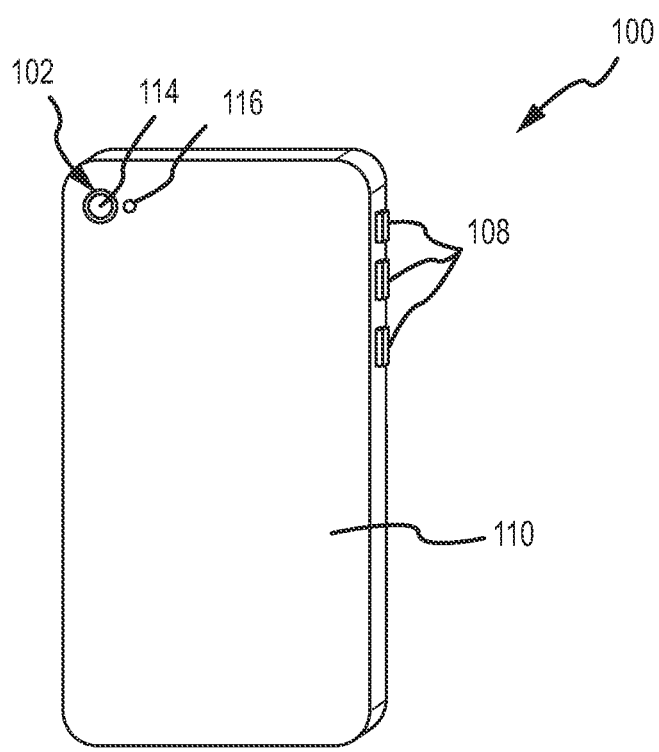
FIG. 1B is a rear perspective view of the electronic device of FIG. 1A.

In some embodiments, the camera system (including the image sensor and the lens) may be incorporated into an electronic device. FIG. 1A is a front perspective view of an exemplary mobile electronic 100 device incorporating a sample camera system 102, in accordance with embodiments described herein. FIG. 1B is a rear perspective view of the mobile electronic device 100. The mobile electronic device 100 may include the camera system 102, a display 104, input buttons 106, 108, and an enclosure 110.

The input buttons 106, 108 may be positioned substantially anywhere on the electronic device 100. The input buttons 106, 108 may be accessible to a user and provide a mechanism for allowing the user to provide input to the electronic device 100. The input buttons 106, 108 may be also provide haptic feedback to a user. The input buttons 106, 108 may be a button, switch, wheel, trackball, or the like.

Figure 2:
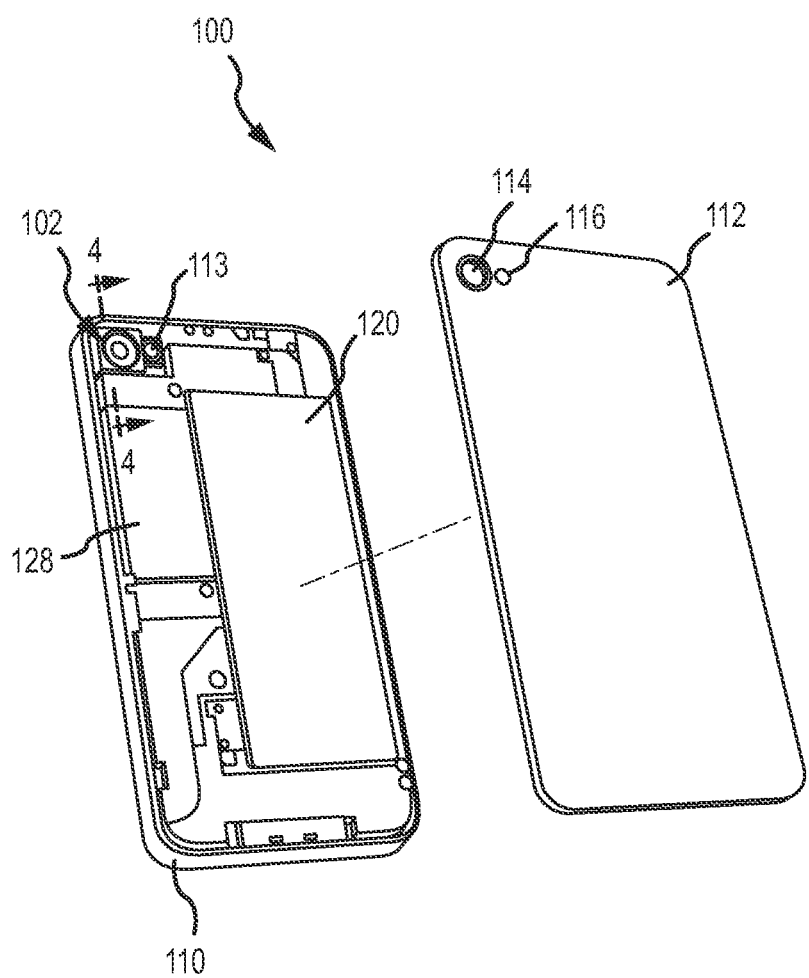
FIG. 2 is a rear perspective view of the electronic device with a rear portion of an enclosure removed.

The enclosure 110 may at least partially surround the components of the electronic device 100. The enclosure 110 may also be removable or otherwise separable into multiple components. This may allow the enclosure 110 to be selectively removed to provide access to select components, while at the same time providing a support and protection for those components. FIG. 2 is an exploded view of the electronic device 100 with a rear portion 112 of the enclosure 110 removed, exposing select components. As can be seen in FIG. 2, the enclosure 110 may include a lens aperture 114 and a flash aperture 116. However, it should be noted that the enclosure 110 may further define additional and/or alternative apertures that may be positioned at other locations on the electronic device 100. For example, the enclosure 110 may include apertures for one or more of the input buttons 106, 108, ports for connection cords (e.g., power cord, headphone jack, and so on). The apertures 114, 116 may provide select components access to the environment outside of the enclosure 110.

The display 104 may provide an output mechanism for the electronic device 100. The display 104 may be substantially any type of output component, such as but not limited to, liquid crystal, plasma, and so on. The display 104 may be viewable through the enclosure 110 and in some embodiments may be only partially covered by the enclosure 110. These embodiments may allow for the display 104 to be viewable through the enclosure 110, as well as allow the display 104 to function as an input/output sensor for the electronic device 100, e.g., as a capacitive touch screen.

Figure 3:
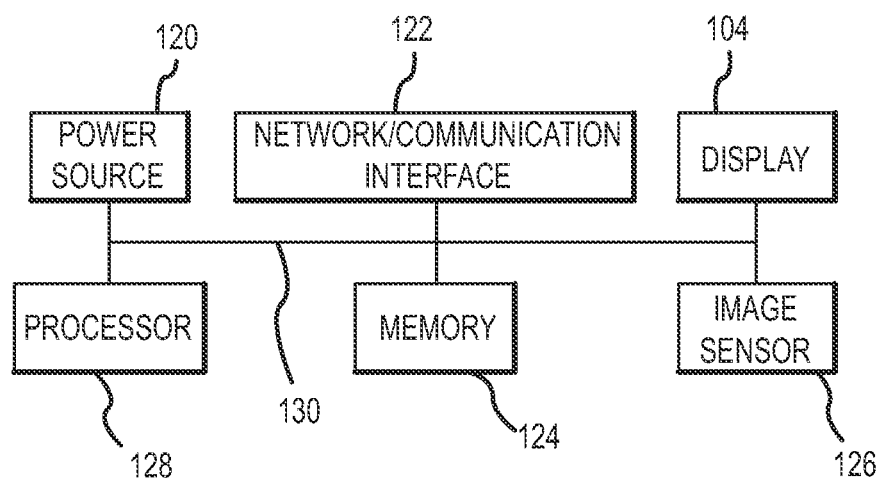
FIG. 3 is an exemplary block diagram of the electronic device.

Certain other components of the electronic device 100 will now be discussed. FIG. 3 is an exemplary block diagram of the electronic device 100. Referring now to FIGS. 2 and 3, the electronic device 100 may further include a power source 120, a network/communication interface 122, memory 124, an image sensor 126, and a processor 128. Select components may be interconnected together via a system bus 130 or other wireless or wired connection.

The power source 120 may provide power, if required, to the image sensor 126, the processor 128, and/or the communication mechanism 122. The power source 120 may be a battery or other portable power source or may be a wired power source, e.g., power cord.

The network/communication interface 122 may provide communication to other devices and/or networks, and the network/communication interface 122 may receive and transmit various electrical signals. For example, the network/communication interface 122 may be used to place phone calls from the electronic device 100, may be used to receive data from a network, or may be used to send and transmit electronic signals via a wireless or wired connection (e.g., Internet, WiFi, Bluetooth, or Ethernet).

The processor 128 may control operation of the electronic device 100 and its various components. The processor 128 may be in communication with the image sensor 126, the memory 124, the display 104, the network/communication interface 122, the display 104, and the power source 120. The processor 128 may be any electronic device capable of processing, receiving, and/or transmitting instructions. For example, the processor 128 may be a microprocessor or a microcomputer.

The memory 124 may store electronic data that may be utilized by electronic device 100. For example, the memory 124 may store electrical data e.g., audio files, video files, document files, and so on, corresponding to various applications. The memory 124 may be, for example, non-volatile storage, a magnetic storage medium, optical storage medium, magneto-optical storage medium, read only memory, random access memory, erasable programmable memory, or flash memory.

Figure 4:
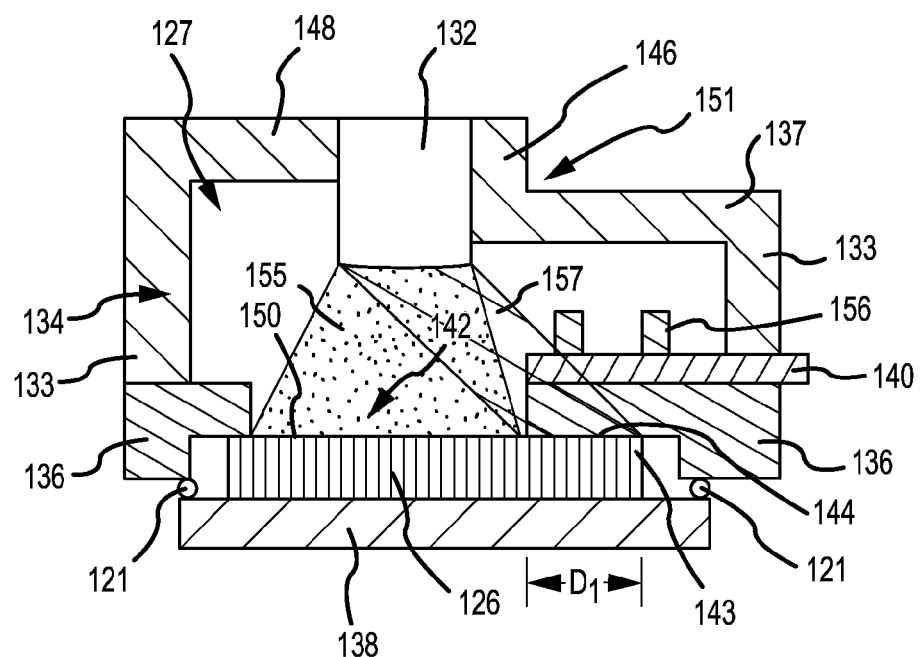
FIG. 4 is a cross-section view of the camera system taken along line 4-4 in FIG. 2.

The camera system 102 will now be discussed in more detail. Initially, it should be noted that the camera system 102 may be incorporated substantially anywhere on the electronic device 100. For example, FIG. 1A illustrates a front positioned camera system 103, which may be substantially the same as the rear camera system 102 illustrated in FIG. 1B. Additionally, in other embodiments, the camera system 102 may be positioned in the middle of the device 100, on a side, or in other locations. FIG. 4 is a cross-sectional view of the electronic device 100 taken along line 4-4 in FIG. 1B. The camera system 102 may include the image sensor 126, a lens 132, a camera enclosure 134, a substrate 136, and a connection component 140. It should be appreciated that FIG. 4 is not necessarily drawn to any particular scale or proportion, and is intended to illustrate certain components generally rather than precise, exact relationships between such components. Likewise, some elements or components may be omitted from the view of FIG. 4 in order to more clearly illustrate what is shown in order to effectively describe certain embodiments. The foregoing is true for all other figures in this application, as well.

In some embodiments, the camera system 102 may include a light source 113. The light source 113 may function as a flash to illuminate a particular environment prior to an image being captured by the image sensor 126. The flash 113 may be in optical communication with the environment outside of the enclosure 110 via the flash aperture 116 defined in the rear 112 of the enclosure 110.

The lens 132 may be in optical communication with the outside of the enclosure 110 via the lens aperture 114. The lens 132 may be substantially any type of optical device that may transmit, focus and/or refract light. The lens 132 is in optical communication with the image sensor 126, such that the lens 132 may transmit light received from its field of view to the sensor 126. The lens 132 may include a single optical element, or may be compound lens and include an array of multiple optical elements. In some examples, the lens 132 may be glass or transparent plastic; however, other materials are possible.

The lens 132 may include a curved surface, and may be a convex, bio-convex, plano-convex, concave, bio-concave, and the like. The type of material of the lens 132 as well as the curvature of the lens 132 may be dependent on the desired applications of the camera system 102. The lens 132 may additionally include a curved surface to better angle the light towards the sensor 126.

In one example, the lens 132 may be at least partially aligned with the lens aperture 114, and generally is substantially or fully aligned therewith. The lens 132 transmits light from outside of the enclosure 110 to the image sensor 126. The lens 132 may be supported at least partially above the image sensor 126 by the camera enclosure 134. In some embodiments, the camera enclosure 134 may be incorporated into the enclosure 110 of the electronic device 100, and in other embodiments, the camera enclosure 134 may be separate from the enclosure 110. In the embodiment shown in FIG. 4, the camera enclosure 134 may substantially surround the components of the camera system 102, so that the components may be substantially protected from damage. Alternative embodiments may not surround the internal components of the camera system. Additionally, the camera enclosure 134, in conjunction with a lid 138, may substantially prevent light from entering into cavity 127 defined by the camera enclosure 134. This may allow the image sensor 126 to only capture light transmitted through the lens 132.

The camera enclosure 134 may include sidewalls 133, and support structures 146, 148 that extend upward over the image sensor 126. The sidewalls 133 are operably connected to a substrate 136 and extend vertically upwards from the substrate 136. The sidewalls 133 each bend and transition to or connect to the support structures 146, 148. The support structures 146, 148 extend horizontally over the image sensor 126 and portions of the substrate 136. The first support structure 146 transitions from a horizontal to a vertical extension at a second bend 151. In this embodiment, the first support structure 146 may include two angles, and its horizontal portion 137 extending over the image sensor 126 may have a lower height with respect to the image sensor 126 than the second support structure 148.

The support structures 146, 148 may extend over at least portion, if not all, of the image sensor 126, such that the image sensor 126 may be at least partially covered by each support structure 146, 148. In some instances, the support structure 146, 148 may act as a ceiling, covering or roof for the image sensor 126. The support structures 146, 148 may support the lens 132 above the image sensor 126 and thus may be connected together via the lens 132. It should be noted that the camera enclosure 134 may often be at least partially enclosed, so that the support structures 146, 148 may form an enclosure that may substantially surround the components of the camera system 102.

In some embodiments, the lens 132 may be offset from the middle of the image sensor 126, for example, the length of the horizontal portion 137 of the first support structure 146 may be longer than a length of the second support structure 148. In these embodiments, at least some portion of the image sensor 126 beneath the horizontal portion 137 may be indirectly lit by light passing through the lens 132. As shown in FIG. 4, a first shaded cone 155 illustrates the directly lit 142 portion of the sensor 126 and a second shaded cone 157 illustrates the indirectly lit 144 portion of the sensor 126 (other shapes are possible, the cones are exemplary only).

The substrate 136 may be operably connected to the image sensor 126, and in some embodiments may form a part of the image sensor 126. The substrate 136 may also facilitate electrical communication to and from the sensor 126. For example the substrate 136 may include electrical connections to the sensor 126, e.g., circuitry in communication with each separate pixel. The substrate 136 may electrically connected to the communication component 140 and may transfer the data signals from the image sensor 126 to the communication component 140

The substrate 136 and/or the camera enclosure 134 may be connected to a lid 138 via a fastener 148. The lid 138 may be positioned on a bottom surface of the image sensor 126, such that the lid 138 may form a bottom of the camera system 102. Additionally, the lid 138 may extend along the area of the image sensor 126, and may terminate prior to the camera enclosure 134 and/or substrate 136. In other embodiments, the lid 138 may extend along the entire length of the camera system 102. In yet other embodiments, the fastener 148 may be omitted and adhesive, ultrasonic welding or the like can be used.

In some examples, the lid 138 may be a component that may partially encapsulate the camera system 102. The lid 138 may be a part such as a metal or plastic sheet that may protect the image sensor 126, substrate 136, and/or communication component 140. The lid 138 may be mounted directly to the substrate 136 or to the enclosure 134. The lid 138 may seal the camera system 102, especially the image sensor 126, from debris, water, or other materials. Furthermore, the lid 138 may provide structural support for the camera system 102, and the lid 138 may be at least partially rigid to absorb force from external loads to the camera system 102 from directly affecting the image sensor 126 and/or communication component 140. The lid 138 may further include an adhesive or binding agent to attach the camera system 102 to the electronic device 100.

A communication component 140 may be in communication with the substrate 136 or circuitry that may be in communication with the sensor 126. The communication component 140 may communicate with a processor 128 located outside of the camera system 102. For example, the communication component 140 may include electrical contacts 156 in communication with the substrate 136, and the communication component 140 may then extend outside of the camera enclosure 134.

The communication component 140 may provide data corresponding to the sensed images and/or ambient light captured by the sensor 126. In one embodiment, the communication component 140 is a flex cable that may extend over a portion of the indirectly lit area 144 of the image sensor 126. In another, the communication component is a printed circuit board. For example, the communication component 140 may extend across a portion of a length of the image sensor 126 by a distance D1. Since the communication component 140 may overlap the sensor 126 in the illustrated embodiment, the overall size of the enclosure may be reduced by the amount of the overlap (e.g., by distance D1).

In some embodiments, although not shown in FIG. 4, the distance D1 may correspond to the length of the horizontal portion 137 of the first support structure. Thus, the communication component 140 and the horizontal portion 137 may extend approximately the same length into the cavity 127 of the camera enclosure 134, as well as cover the image sensor 126 by approximately the same area.

Figure 7:
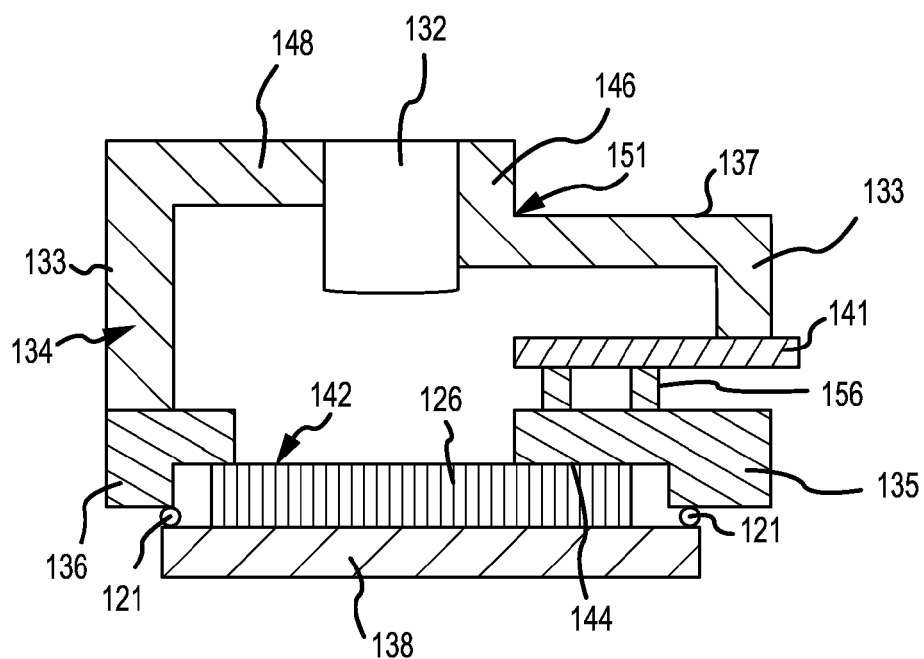
FIG. 7 is a cross-section view of another example of the camera system of FIG. 4.

In some embodiments, the orientation of the communication component 140 may be reversed. For example, FIG. 7 is a cross-sectional view of the camera system 102 illustrating a flip chip 141 used as the communication component 140. In this example, the flip chip 141 is positioned so that the electrical contacts 156 are adjacent a top surface of the sensor 126, rather than being positioned away from the top surface of the sensor 126. In this example, the electrical contacts 156 may be connected directly to the sensor circuit 135, rather than being connected via other wiring or the like, as shown in FIG. 4.

With respect to both FIGS. 4 and 7, the image sensor 126 is at least partially in optical communication with the lens 132. The image sensor 126 may be substantially any type of sensor that may capture an image or sense a light pattern. The sensor 126 may be able to capture visible, non-visible, infrared and other wavelengths of light. The sensor 126 may be an image sensor that converts an optical image into an electronic signal. In some embodiments, the sensor 126 may capture polarized light. For example, the sensor 126 may be a charged coupled device, complementary metal-oxide-semiconductor (CMOS) sensor. The sensor 126 may also include a filter that may itself filter different wavelengths. The sensor 126 may also be back-lit.

The image sensor 126 may be partially aligned with the lens 132, so that the image sensor 126 may only be partially exposed to light transmitted through the lens 132. Accordingly, the image sensor 126 may include a directly lit area 142, an indirectly lit area 144, and a non-lit portion 143. The indirectly lit area 144 and the non-lit area 143 may be partially covered by the communication component 140, the substrate 136, or other components that may be positioned adjacent to or form a portion of the camera system 102.

As one example of the foregoing, the image sensor 126 may be a five megapixel sensor, but only three megapixels of the sensor may be in the directly-lit area 142. Thus, the image sensor 126 may only capture light corresponding to a three megapixel area, with two megapixels acting as "dead" pixels. In these embodiments, the cost associated with the camera system 102 may be reduced as some higher megapixel image sensors may be less expensive than lower megapixel sensors. For example, given two image sensors having the same image resolution, the larger sensor is generally less expensive. Physically smaller sensors may be more complex to manufacture when compared to larger sensors, presuming the two have the same image resolution and/or pixel density. The camera system 102 may include a flexible enclosure 134 in order to accommodate a substantial variety of sensors of differing size. As such, the camera system 102 may use a cheaper image sensor, without substantially sacrificing space within the enclosure 110 of the electronic device 100.

Furthermore, the configuration of the camera system 102 may allow the image sensor 126 to function as essentially two separate sensors. For example, a first part of the image sensor may capture the light transmitted through the lens 132 and the second part may capture indirect or ambient light and act as an ambient light sensor. This ambient light sensor data may be used to enhance the resulting final image of the light transmitted through the lens 132 as processed by the processor 128. For example, a white point balance may be adjusted, an automated filter selection may be selected to help compensate for overly bright or dark scenes, color saturation may be varied, or a shutter speed may be adjusted to compensate for dark versus light scenes, and so on.

Figure 5:
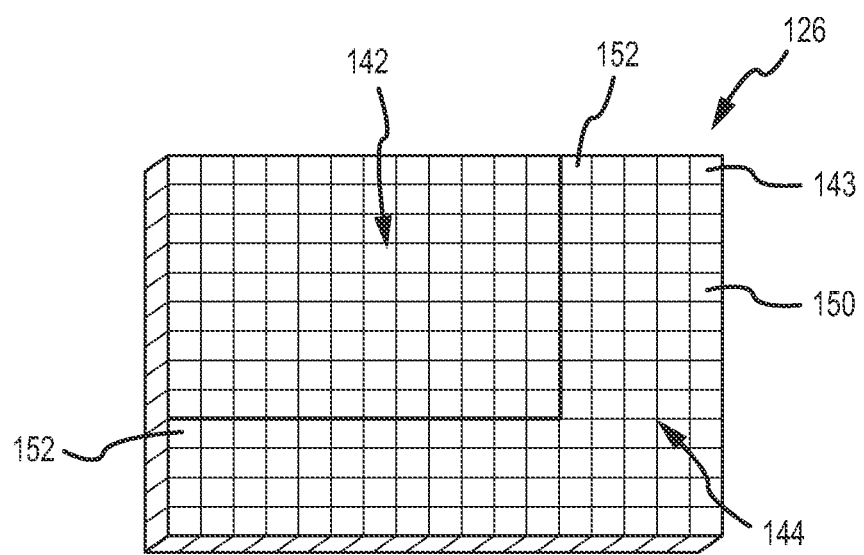
FIG. 5 is a front perspective view an image sensor removed from the camera system illustrating a direct-lit area and a non-direct lit area.

The different portions or areas of the image sensor 126 will now be discussed in further detail. FIG. 5 is a top plan view of the image sensor 126 illustrating one example of the directly lit area 142 and the indirectly lit area 144. Furthermore, in some embodiments, the sensor 126 may include the non-lit area 143. The non-lit area 143 may correspond to portions or pixels of the image sensor 126 where light cannot reach based on the position of the enclosure 134, connection component 140, and so on. It should be appreciated that the position of the directly lit area and the indirectly lit area may vary between embodiments, as the geometry of the sensor, lens, communication component and/or enclosure change, as well as the spatial relationship between such elements.

Figure 6:
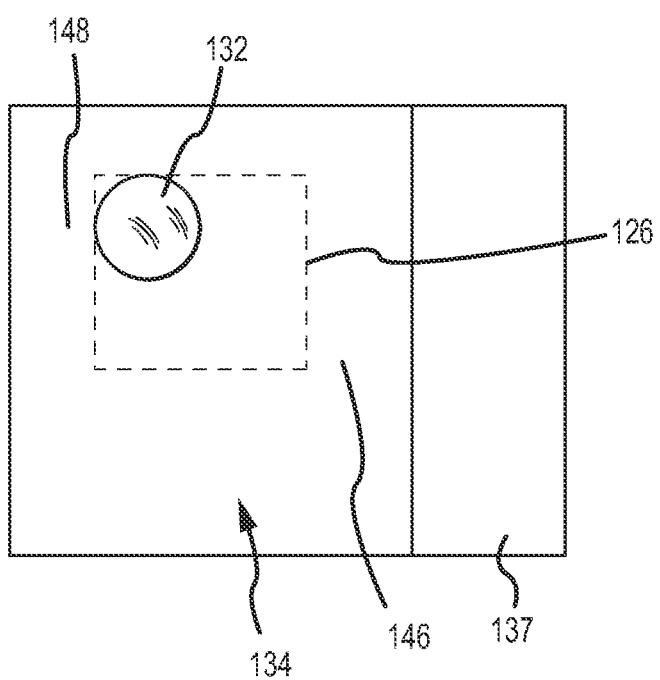
FIG. 6 is a top plan view of the camera system removed from the electronic device.

FIG. 6 is a top plan view of the camera system 102, including the camera enclosure 134 and lens 132 with an exemplary position of the image sensor 126 outlined in dashed lines. This positioning generally corresponds to the position of the directly and indirectly lit areas 142, 144 shown in FIG. 5. The image sensor 126 may include pixels 150 arranged in a grid. Each pixel 150 may be able to capture light transmitted to the sensor 126. The pixels 150 may be substantially any desired size and may include various filters (such as color filters), as well as a cover lens, or other layers.

As shown in FIG. 6, the image sensor 126 may extend past the lens 132, which may allow the lens 132 to be offset from a middle of the image sensor 126. The offset or non-centered position of the lens 132 with respect to the image sensor 126 provides for flexibility in a mounting location for the lens 132 by the enclosure 134.

Additionally, as described above, the image sensor 126 may have portions or areas that are not exposed to direct or focused light from the lens 132. In these embodiments, there may be one or more pixel rows 152 that may border the directly lit area 142. These pixel rows 152 may receive some non-direct light from the lens 132. In other words, the light transmitted to these pixel rows 152 may be ambient light transmitted through and around the lens 132 but may not be light that is focused by the lens 132.

As can be seen best in FIG. 6, the support structures 146, 148 and the lens 132 may only cover a portion of the image sensor 126. This may allow other components of the electronic device 100 to be positioned adjacent to the camera system 102 and on top of the sensor 126 location. For example, referring to FIGS. 4, and 6, the support structure 146 may be depressed inward towards a center of the camera system 102. This depression or bend 151 may allow another component to be positioned on top of the support structure 146 and/or adjacent to the support structure 146. In other words, a second component may be positioned on the top surface of the horizontal portion 137 of the enclosure 134.

Furthermore, the communication component 140, substrate 136, and/or camera enclosure 134 may be positioned on top of a portion of the indirectly area 144 of the image sensor 126. In one example, the communication component 140 may be positioned over the image sensor 126 a distance of D. In some conventional camera systems, the communication cables or components may often be placed adjacent to the image sensor. Thus, the entire camera system may often need to be expanded to include the image sensor and a portion of the communication cable positioned side by side. This is so that the communication component may not block pixels from receiving focused light. On the contrary, the image camera system 102 reduces the overall size of the camera system 102 by placing the communication component 140 on top of a portion of the image sensor 126.

It should be noted that in other embodiments, the lens 132 may be centered over a corner of the image sensor 126, or at another location. Essentially, the lens 132 may be positioned at substantially any location, as long as portion of the image sensor 126 may be in optical communication with the lens 132. This may allow for the camera system 102 to be extremely flexible as the directly-lit area 142 and the indirectly lit area 144 may be designed based on the space within the enclosure 110 or the like.

Now the operation of the camera system 102 will be discussed in more detail. Referring now to FIG. 4, the lens 132 receives and focuses light from the environment outside of the enclosure 110. The light may be transmitted through the lens aperture 114 within the rear 112 of the enclosure 110. The support structures 146, 148 may substantially prevent light from entering into the cavity 127 without being transmitted through the lens 132. The transmitted light may then encounter the image sensor 126, and specifically the direct lit area 142. The image sensor 126 may then capture an image of the light on the directly lit area 142.

Prior to or as the light encounters the directly lit area 142, the pixel rows 152 surrounding or bordering the directly lit area 142 may capture ambient light. The ambient light may be light that is not focused by the lens 132. The pixel rows 152 surrounding the directly lit area 142 may provide an image or data corresponding to the ambient light of the environment.

The communication component 140 may then transfer data corresponding to the image of the light transmitted through the lens 132 as well as the ambient light to the processor 128. The processor 128 may then use the ambient light data to enhance or modify the image of the light through the lens 132. In other embodiments, the ambient light data may be disregarded, or may not be transmitted to the processor 128.

Conclusion

The foregoing description has broad application. For example, while examples disclosed herein may focus on an image sensor, it should be appreciated that the concepts disclosed herein may equally apply to other types of sensors. Similarly, although the input device may be discussed as being an mobile electronic device the devices and techniques disclosed herein are equally applicable to other types of devices. Accordingly, the discussion of any embodiment is meant only to be exemplary and is not intended to suggest that the scope of the disclosure, including the claims, is limited to these examples.

What is claimed is:

1. An image sensing system comprising:
  a lens;
  an image sensor defining an indirectly lit area and a directly illuminated area on a surface of the image sensor, wherein the lens is in direct optical communication with the directly illuminated area; and
  an obstruction positioned between the lens and at least a portion of the image sensor including the indirectly lit area, the obstruction partially preventing optical communication between the lens and the portion of the image sensor by covering a portion of the indirectly lit area,
  wherein a portion of ambient light travels from the lens to the indirectly lit area, and
  wherein the obstruction is adjacent to and positioned above the portion of the indirectly lit area on the surface of the image sensor.

2. The image sensing system of claim 1, wherein the image sensor further comprises a non-illuminated area.

3. The image sensor system of claim 1, further comprising a camera enclosure supporting the lens at least partially above the image sensor.

4. The image sensor system of claim 3, wherein the camera enclosure further comprises a first sidewall;
  a second sidewall;
  a first support structure extending from the first sidewall and supporting the lens on a first side; and
  a second support structure extending from the second sidewall and supporting the lens on a second side; wherein the lens is offset from a middle of the image sensor.

5. The image sensor system of claim 4, wherein the second support structure further includes a horizontal portion extending horizontally over the indirectly illuminated area of the image sensor.

6. The image sensor system of claim 1, wherein the obstruction comprises a communication component extending over at least a portion of the indirectly illuminated area.

7. The image sensor system of claim 6, wherein the communication component is one of a flex cable or flip chip.

8. The image sensor system of claim 6, wherein the communication component abuts the image sensor.

9. The image sensor system of claim 1, wherein the lens is substantially centered over the directly illuminated area of the image sensor, but not substantially centered over the entirety of the image sensor.

10. A method for assembling a camera system comprising:
  providing an image sensor having a directly illuminated surface area and a second indirectly lit surface area;
  operably connecting an enclosure to the image sensor, the enclosure comprising:
    a first support structure; and
    a second support structure; and
  aligning a lens over a first the directly illuminated surface area of the image sensor, so that light transmitted through the lens impacts but not directly, a second the indirectly lit surface area of the image sensor,
  wherein an obstruction is positioned between the lens and image sensor, including the indirectly lit area, the obstruction partially preventing optical communication between the lens and the portion of the image sensor by covering a portion of the indirectly lit area, and
  wherein the obstruction is adjacent to and positioned above the portion of the indirectly lit area on the surface of the image sensor.

11. The method for assembling a camera system of claim 10, further comprising connecting a communication component to the image sensor, wherein at least a portion of the communication component overlays a portion of the indirectly lit surface area of the image sensor.

12. The method for assembling a camera system of claim 10, further comprising attaching a seal to a bottom surface of the image sensor.

13. The method for assembling a camera system claim 10, wherein at least one pixel positioned in the indirectly lit surface area of the image sensor is an ambient light sensor.

14. An electronic device comprising:
  a processor;
  a display in communication with the processor;
  a camera system in communication with the processor, comprising:
    a lens;
    an image sensor defining:
      a non-illuminated area on a surface of the image sensor;
      a partially illuminated area on the surface of the image sensor; and
      a directly illuminated area on the surface of the image sensor,
      wherein the lens is in optical communication with the directly illuminated area, but is not in optical communication with the non-illuminated area; and
    an obstruction positioned between the lens and image sensor, including the partially illuminated area, the obstruction partially preventing optical communication between the lens and the portion of the image sensor by covering a portion of the partially illuminated area, and
  wherein the obstruction is adjacent to and positioned above the portion of the partially illuminated area on the surface of the image sensor.

15. The electronic device of claim 14, wherein: the image sensor further includes an indirectly illuminated area; and at least a portion of the indirectly illuminated area functions as an ambient light sensor.

16. The electronic device of claim 14, further comprising a flash light source in communication with the processor.

17. The electronic device of claim 14, further comprising a camera enclosure supporting the lens at least partially above the image sensor.

18. The electronic device of claim 17, wherein the camera enclosure further comprises a first sidewall; a second sidewall; a first support structure extending at a right angle from the first sidewall and supporting the lens on a first side; and a second support structure extending at a right angle from the second sidewall and supporting the lens on a second side.

19. The electronic device of claim 18, wherein the second support structure further includes a horizontal portion extending horizontally over at least a portion of indirectly illuminated area of the image sensor.

20. The electronic device of claim 14, further comprising a communication component extending over at least a portion of the indirectly illuminated area.

\* \* \* \* \*